United States Patent
Sugaya (10) Patent No.: US 10,535,154 B2
(45) Date of Patent: Jan. 14, 2020

(54) SYSTEM, METHOD, AND PROGRAM FOR IMAGE ANALYSIS

(71) Applicant: OPTiM Corporation, Saga-shi (JP)

(72) Inventor: Shunji Sugaya, Tokyo (JP)

(73) Assignee: OPTIM CORPORATION, Saga-Shi (JP)

( * ) Notice: Subject to any disclaimer, the term of this patent is extended or adjusted under 35 U.S.C. 154(b) by 0 days.

(21) Appl. No.: 15/553,612

(22) PCT Filed: Oct. 31, 2016

(86) PCT No.: PCT/JP2016/082297
§ 371 (c)(1),
(2) Date: Aug. 25, 2017

(87) PCT Pub. No.: WO2018/078862
PCT Pub. Date: May 3, 2018

(65) Prior Publication Data
US 2018/0350092 A1    Dec. 6, 2018

(51) Int. Cl.
*G06T 7/60*      (2017.01)
*G06T 7/70*      (2017.01)
*G06T 7/80*      (2017.01)
*G06T 7/00*      (2017.01)
*H04N 7/18*      (2006.01)
*H04N 5/232*     (2006.01)
*G06F 16/51*     (2019.01)
(Continued)

(52) U.S. Cl.
CPC ............... *G06T 7/70* (2017.01); *G06F 16/51* (2019.01); *G06F 16/587* (2019.01); *G06F 16/5854* (2019.01); *G06T 7/00* (2013.01); *G06T 7/80* (2017.01); *H04N 5/23206* (2013.01); *H04N 7/183* (2013.01); *G06K 9/00624* (2013.01); *G06K 9/6215* (2013.01)

(58) Field of Classification Search
CPC .. G06F 16/00; G06K 9/00624; G06K 9/6215; G06T 7/00; G06T 7/70; G06T 7/80; H04N 5/23206; H04N 7/183
USPC ........... 386/239, 242; 348/36, 161; 382/224, 382/103
See application file for complete search history.

(56) References Cited

U.S. PATENT DOCUMENTS 9,319,583 B2 *   4/2016   Moon .................. H04N 9/8233
9,407,815 B2 *   8/2016   Bostick ................... G06F 16/29
(Continued)

FOREIGN PATENT DOCUMENTS

JP    2000-306095    11/2000
JP    2009-225097    10/2009
JP    2011-192093    9/2011

*Primary Examiner* — Thai Q Tran
*Assistant Examiner* — Stephen R Smith
(74) *Attorney, Agent, or Firm* — Lex IP Meister, PLLC (57) ABSTRACT

The system for image analysis that analyzes an image taken by a camera improves the accuracy of detection and identification an object in image analysis. The system stores a plurality of analyzed past images and their imaging environment data sets that include setting data of a camera that took the past image and data on an object; includes an acquisition module 211 that acquires an image and a similar image extraction module 212 that extracts a past image similar to the image; and applies the imaging environment data set of the extract past image to the acquired image and analyzes the acquired image.

8 Claims, 8 Drawing Sheets

(51) Int. Cl.
    *G06F 16/587*    (2019.01)
    *G06F 16/583*    (2019.01)
    *G06K 9/62*       (2006.01)
    *G06K 9/00*       (2006.01)

(56) References Cited

U.S. PATENT DOCUMENTS

| | | | |
|---|---|---|---|
| 10,230,866 B1* | 3/2019 | Townsend | H04N 1/2108 |
| 2011/0222743 A1 | 9/2011 | Tanaka et al. | |
| 2017/0300511 A1* | 10/2017 | Brewington | G06F 16/29 |
| 2018/0192249 A1* | 7/2018 | Lehtiniemi | H04W 4/04 |

\* cited by examiner

| Imaging data set | Imaging angle | Type | Distance | Illuminance | Place | Weather | Image |
|---|---|---|---|---|---|---|---|
| Set1 | 10 degrees | Human | 3 m | 100 lux | Outside | Cloudy | ImageA |
| Set2 | 15 degrees | Device | 10 m | 200 lux | Inside | — | ImageB |
| Set3 | 45 degrees | Animal | 5 m | 500 lux | Inside | — | ImageC |
| Set4 | 30 degrees | Plant | 8 m | 240 lux | Outside | Clear | ImageD |
| ⋮ | | | | | | | |

ImageA

ImageB

ImageC

ImageD

FIG. 6

| Imaging data set | Imaging angle | Type | Distance | Illuminance | Place | Weather | Image |
|---|---|---|---|---|---|---|---|
| Set1 | 10 degrees | Human | 3 m | 100 lux | Outside | Cloudy | ImageA |
| Set2 | 15 degrees | Device | 10 m | 200 lux | Inside | — | ImageB |
| Set3 | 45 degrees | Animal | 5 m | 500 lux | Inside | — | ImageC |
| Set4 | 30 degrees | Plant | 8 m | 240 lux | Outside | Clear | ImageD |
| Set5 | 30 degrees | Plant | 8 m | 240 lux | Outside | Clear | ImageX |
| ⋮ | | | | | | | |

ImageA

ImageB

ImageC

ImageD

ImageX

SYSTEM, METHOD, AND PROGRAM FOR IMAGE ANALYSIS

TECHNICAL FIELD

The present invention relates to a system, a method, and a program for image analysis that improve the accuracy of detection and identification of an object in image analysis, in the system for image analysis that analyzes an image taken by a camera.

BACKGROUND ART

Some imaging devices are capable to take an image by using imaging setting information of the same content as that of a recorded image taken in the past (Patent Document 1).

CITATION LIST

Patent Literature

Patent Document 1: JP 2009-225097 A

SUMMARY OF INVENTION

However, the device of Patent Document 1 needs to apply the imaging setting information of the same content as that of a recorded image before taking an image and thus cannot perform appropriate image processing for an image that has already been taken. In recent years, there has been a need for image analysis that processes a large number of images containing various objects that were taken with a camera mounted on an uninhabited airborne vehicle, a wearable device, a security camera, etc. In this case, the technique described in Patent Document 1 that requires the settings before an image is taken is inappropriate. For image analysis, the environment when an image was taken is used so that the accuracy of detection and identification of an object can be expected to be more improved.

In view of the above-mentioned problems, the objective of the present invention is to provide a system, a method, and a program for image analysis that improve the accuracy of detection and identification of an object in image analysis, in the system for image analysis that analyzes an image taken by a camera.

The first aspect of the present invention provides a system for image analysis, including:

a past image memory unit that associates and stores a plurality of analyzed past images with an imaging environment data set that includes setting data of a camera that took the past image and data on an object;

an acquisition unit that acquires an image;

a similar image extraction unit that extracts a past image similar to the acquired image from the stored past images; and an image analysis unit that applies the imaging environment data set of the extracted past image when image analysis was performed and analyzes the acquired image.

According to the first aspect of the present invention, a system for image analysis includes: a past image memory unit that associates and stores a plurality of analyzed past images with an imaging environment data set that includes setting data of a camera that took the past image and data on an object; an acquisition unit that acquires an image; a similar image extraction unit that extracts a past image similar to the acquired image from the stored past images; and an image analysis unit that applies the imaging environment data set of the extracted past image when image analysis was performed and analyzes the acquired image.

The first aspect of the present invention is the category of a system for image analysis, but the categories of a method and a program for image analysis have similar functions and effects.

The second aspect of the present invention provides the system according to the first aspect of the present invention, in which the past image memory unit newly associates and stores the acquired image with the imaging environment data set applied by the image analysis unit.

According to the second aspect of the present invention, in the system according to the first aspect of the present invention, the past image memory unit newly associates and stores the acquired image with the imaging environment data set applied by the image analysis unit.

The third aspect of the present invention provides the system according to the first or the second aspect of the present invention, in which the plurality of past images stored in the past image memory unit are 360-degree images.

According to the third aspect of the present invention, in the system according to the first or the second aspect of the present invention, the plurality of past images stored in the past image memory unit are 360-degree images.

The fourth aspect of the present invention provides a method for image analysis, including the steps of:

associating and storing a plurality of analyzed past images with an imaging environment data set that includes setting data of a camera that took the past image and data on an object;

acquiring an image;

extracting a past image similar to the acquired image from the stored past images; and applying the imaging environment data set of the extracted past image when image analysis was performed and analyzes the acquired image.

The fifth aspect of the present invention provides a program for image analysis to execute the steps of:

associating and storing a plurality of analyzed past images with an imaging environment data set that includes setting data of a camera that took the past image and data on an object;

acquiring an image;

extracting a past image similar to the acquired image from the stored past images; and applying the imaging environment data set of the extracted past image when image analysis was performed and analyzes the acquired image.

The present invention can provide a system, a method, and a program for image analysis that improve the accuracy of detection and identification of an object in image analysis, in the system for image analysis that analyzes an image taken by a camera.

DESCRIPTION OF EMBODIMENTS

Embodiments of the present invention will be described below with reference to the attached drawings. However, these are illustrative only, and the technological scope of the present invention is not limited thereto.

Overview of System for Image Analysis

Figure 1:
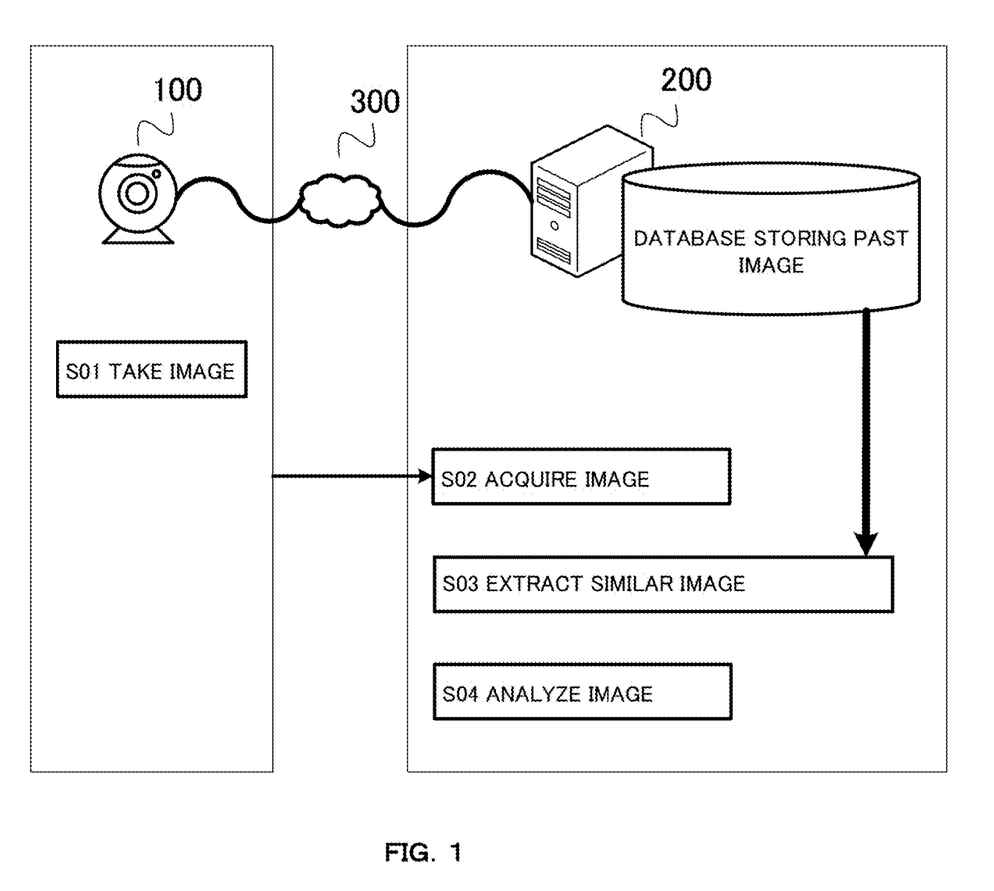
FIG. 1 shows a schematic diagram of a preferable embodiment of the present invention.

FIG. 1 shows a schematic diagram of a preferable embodiment of the present invention. The overview of the present invention will be described below with reference to FIG. 1. The system for image analysis includes a camera 100, a computer 200, and a communication network 300.

In FIG. 1, the number of the cameras 100 is not limited to one and may be two or more. Furthermore, the computer 200 is not limited to actual devices and may be virtual devices.

Figure 2:
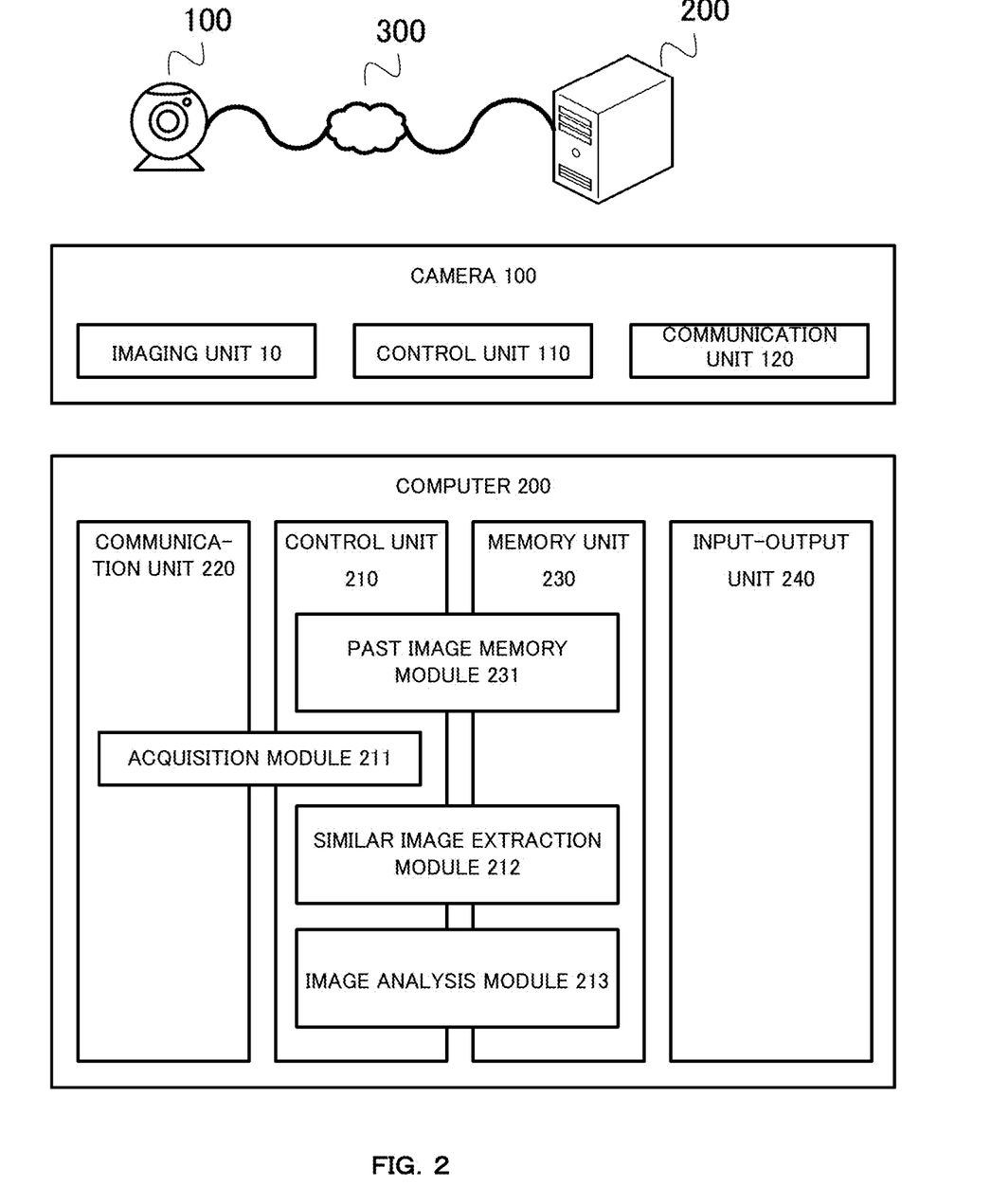
FIG. 2 shows a functional block diagram of the camera 100 and the computer 200 to illustrate the relationship among the functions.

The camera 100 includes an imaging unit 10, a control unit 110, and a communication unit 120 as shown in FIG. 2. The computer 200 includes a control unit 210, a communication unit 220, a memory unit 230, and an input-output unit 240 as shown in FIG. 2. The control unit 210 achieves an acquisition module 211 in cooperation with the communication unit 220. The control unit 210 also achieves a similar image extraction module 212 and an image analysis module 213 in cooperation with the memory unit 230. The memory unit 230 achieves a past image memory module 231 in cooperation with the control unit 210. The communication network 300 may be a public line network such as the Internet or a private line network, which enables the communication between the camera 100 and the computer 200.

The camera 100 is provided with imaging devices such as an imaging element and a lens, which is capable of data communication with the computer 200. The camera 100 is also capable to determine the distance to an object or to image an object from two or more different directions at the same time. The attached drawings show a WEB camera as an example of the camera 100. However, the camera 100 may be an imaging device provided with necessary functions, such as a digital camera, a digital video camera, and a camera mounted on an uninhabited airborne vehicle or a wearable device, a security camera, a car-mounted camera, or a 360-degree camera.

The computer 200 is a computer device that is capable of data communication with the camera 100. The attached drawings show a desktop computer as an example of the computer 200. Examples of the computer 200 include electrical appliances such as a mobile phone, a mobile information terminal, a tablet terminal, a personal computer, a net book terminal, a slate terminal, an electronic book terminal, and a portable music player, and wearable terminals such as smart glasses and a head mounted display.

In the system for image analysis shown in FIG. 1, the computer 200 is provided with a database storing a past image. The database storing a past image associates and stores an analyzed past image with an imaging environment data set that includes setting data of a camera that took the past image and data on an object. The imaging environment data set is a set of environment data when an image is taken, including the angle in the horizontal direction of the camera when an image is taken, the type of an object, the distance to an object, the illuminance, the place, and the weather. The past image memory module 231 of the computer 200 previously stores a plurality of past images and their imaging environment data sets in the database storing a past image.

The imaging unit 10 of the camera 100 takes an image such as a still or moving image of a target object (Step S01). The camera 100 images a human, an animal, a landscape, an article, a crop, a tree, etc., as an object.

The acquisition module 211 of the computer 200 acquires an image taken by the camera 100 (Step S02).

Figure 5:
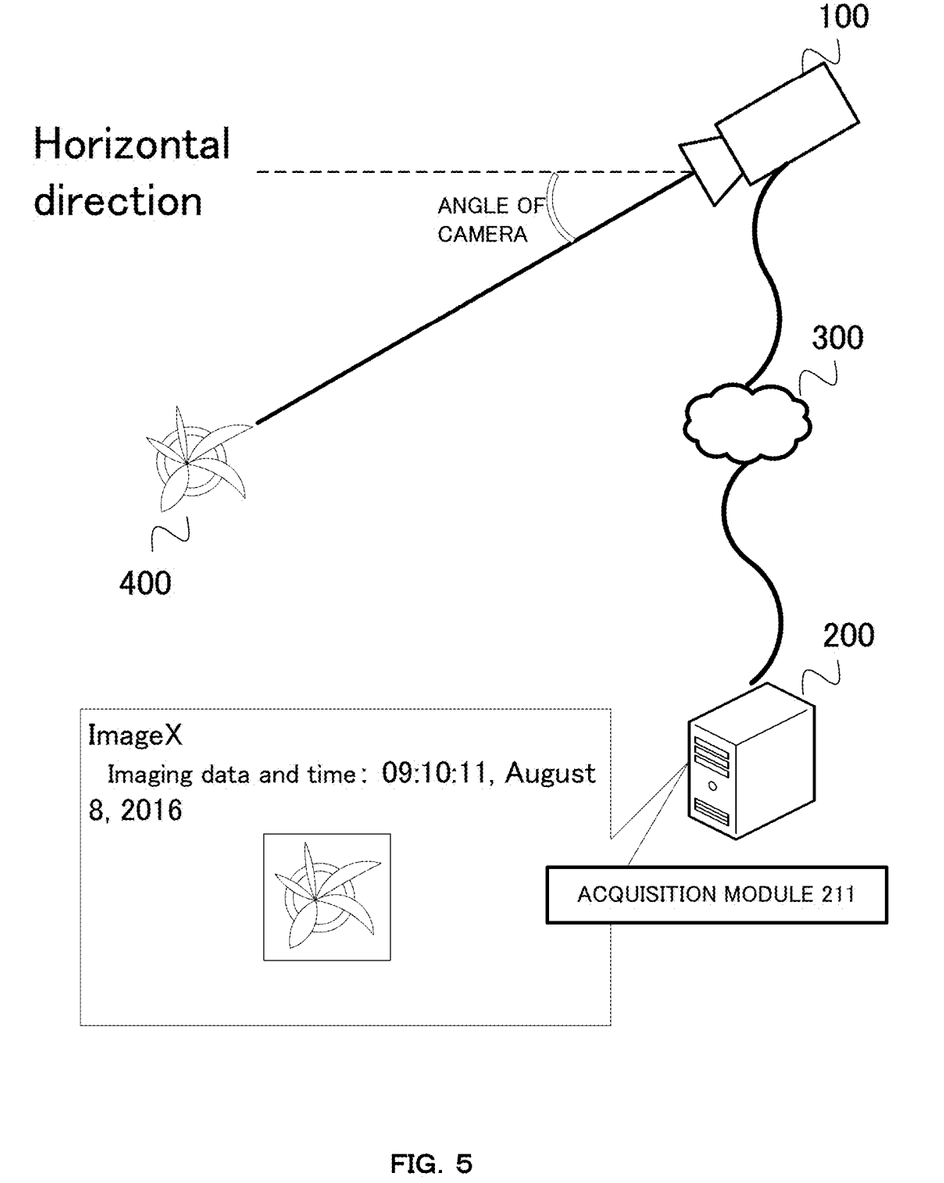
FIG. 5 shows one example where the camera 100 images an object 400.

FIG. 5 shows one example where the camera 100 images an object 400. This example shows that the acquisition module 211 of the computer 200 connected with the camera 100 through the communication network 300 acquires the image "ImageX" taken at 09:10:11, Aug. 8, 2016.

The similar image extraction module 212 of the computer 200 compares the image acquired in the step S02 with a past image registered in the database storing a past image and extracts a similar image (step S03).

Figure 6:
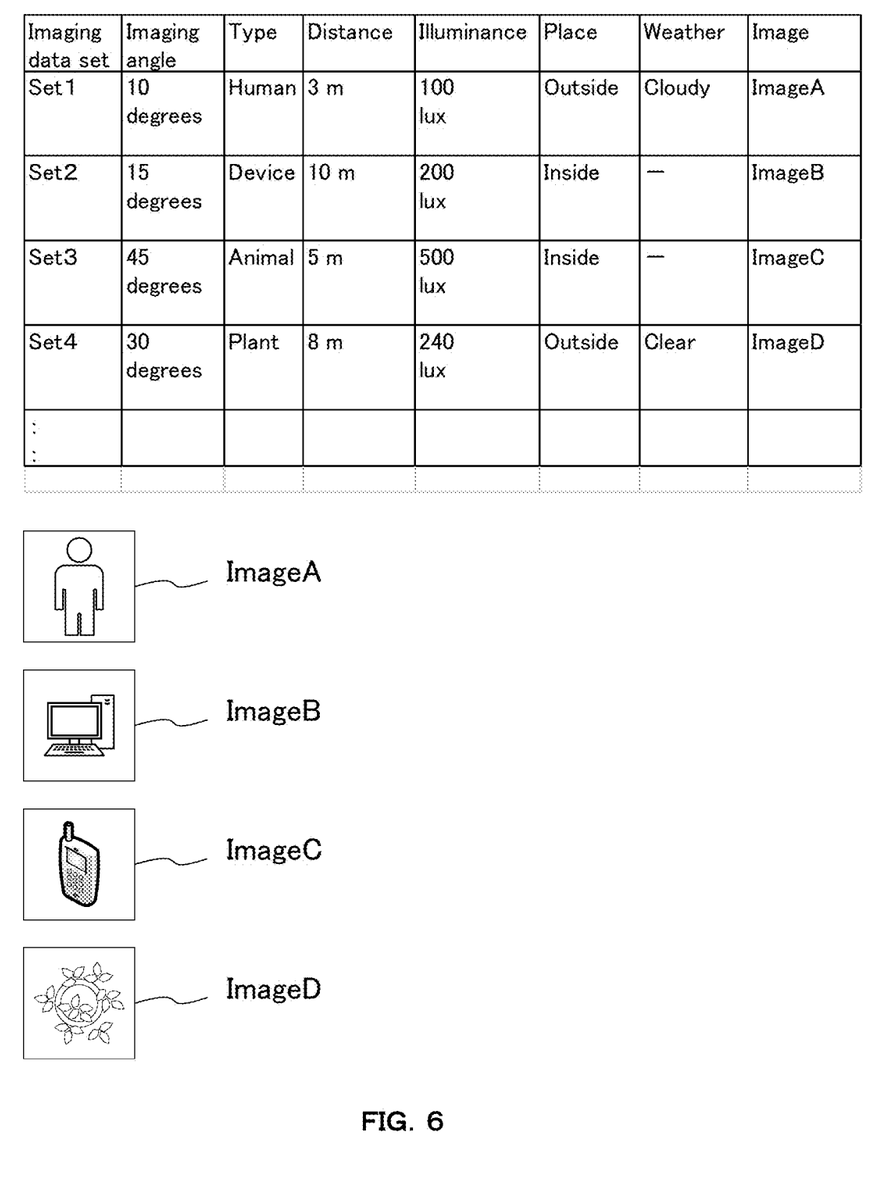
FIG. 6 shows a table illustrating one example of the data structure of the imaging environment data set.

FIG. 6 shows a table illustrating one example of the data structure of the imaging environment data set. In this example, an image has been registered together with an imaging environment data set. The image "ImageA" is associated with "Set 1," the image "ImageB" is associated with "Set2," the image "ImageC" is associated with "Set3," and the image "ImageD" associated with "Set4." The images "ImageA" to "ImageD" are schematically shown in FIG. 6. If the image acquired in the step S02 is the object 400 shown in FIG. 5, the past image similar to "ImageD" with "Set4" is extracted as a similar image in the step S03.

Finally, the image analysis module 213 of the computer 200 analyzes the image (Step S04). In this example, the image analysis module 213 analyzes the image "ImageX" by using the imaging environment data set "Set4" including "the angle in the horizontal direction of the camera when an image is taken: 30 degrees, the type of the object: a plant, the distance to the object: 8 meters, the illuminance: 240 lux, the place: outside, and the weather: clear." The image analysis performed by using the imaging environment data set "Set4" of "ImageD" similar to "ImageX" can obtain a better identification accuracy in a shorter time than by using the imaging environment data "Set1" including "the angle in the horizontal direction of the camera when an image is taken: 10 degrees, the type of the object: a human, the distance to the object: 3 meters, the illuminance: 100 lux, the place: outside, and the weather: cloudy."

The image analysis is appropriately performed in accordance with specific purposes such as face recognition to identify an individual, check of the extent of the damage to farm products caused by harmful insects, check of warehouse inventory, and image recognition of an affected area for medical diagnosis. Examples of the image analysis parameter include a filter range, the intensity of a filter, a binarization threshold, and an image processing order, which are also appropriately selected in accordance with specific purposes.

As described above, the present invention can provide a system, a method, and a program for image analysis that improve the accuracy of detection and identification of an object in image analysis, in the system for image analysis that analyzes an image taken by a camera.

Functions

FIG. 2 shows a functional block diagram of the camera 100 and the computer 200 to illustrate the relationship among the functions. The camera 100 includes an imaging unit 10, a control unit 110, and a communication unit 120. The computer 200 includes a control unit 210, a communication unit 220, a memory unit 230, and an input-output unit 240. The control unit 210 achieves an acquisition module 211 in cooperation with the communication unit 220. The control unit 210 also achieves a similar image extraction module 212 and an image analysis module 213 in cooperation with the memory unit 230. The memory unit 230 achieves a past image memory module 231 in cooperation with the control unit 210. The communication network 300 may be a public line network such as the Internet or a private line network, which enables the communication between the camera 100 and the computer 200.

The camera 100 is provided with imaging devices such as an imaging element and a lens, which is capable of data communication with the computer 200. The camera 100 is also capable to determine the distance to an object or to image an object from two or more different directions at the same time. The attached drawings show a WEB camera as an example of the camera 100. However, the camera 100 may be an imaging device provided with necessary functions, such as a digital camera, a digital video camera, and a camera mounted on an uninhabited airborne vehicle or a wearable device, a security camera, a car-mounted camera, or a 360-degree camera.

The camera 100 also includes an imaging unit 10 including a lens, an imaging device, various buttons, and a flash, which takes an image such as a still or moving image. The obtained taken image is an accurate image with information as much as the image analysis needs. The pixel count and the image quality can be specified.

The control unit 110 includes a central processing unit (hereinafter referred to as "CPU"), a random access memory (hereinafter referred to as "RAM"), and a read only memory (hereinafter referred to as "ROM").

The communication unit 120 includes a device that is communicative to other devices, such as a Wireless Fidelity (Wi-Fi®) enabled device complying with, for example, IEEE 802.11, or a wireless device complying with the IMT-2000 standard such as the third and the fourth generation mobile communication systems. The communication unit may include a wired device for LAN connection.

The computer 200 is a computer device that is capable of data communication with the camera 100. The attached drawings show a desktop computer as an example of the computer 200. Examples of the computer 200 include electrical appliances such as a mobile phone, a mobile information terminal, a tablet terminal, a personal computer, a net book terminal, a slate terminal, an electronic book terminal, and a portable music player, and wearable terminals such as smart glasses and a head mounted display.

The control unit 210 includes a CPU, a RAM, and a ROM. The control unit 210 achieves an acquisition module 211 in cooperation with the communication unit 220. The control unit 210 also achieves a similar image extraction module 212 and an image analysis module 213 in cooperation with the memory unit 230.

The communication unit 220 includes a device that is communicative to other devices, such as a Wi-Fi® enabled device complying with, for example, IEEE 802.11, or a wireless device complying with the IMT-2000 standard such as the third and the fourth generation mobile communication systems. The communication unit may include a wired device for LAN connection.

The memory unit 230 includes a data storage unit such as a hard disk or a semiconductor memory, which stores images and data necessary for processing the extraction results of similar images, extracted similar images and their extracted imaging environment data sets, and the image analysis results. The memory unit 230 achieves a past image memory module 231 in cooperation with the control unit 210. The memory unit 230 may be provided with a database storing a past image.

The input-output unit 240 has functions necessary to use the system for image analysis. As an example to achieve the input, the input-output unit 240 may include a liquid crystal display with a touch panel function, a keyboard, a mouse, a pen tablet, a hardware button on the device, and a microphone to perform voice recognition. As an example to achieve the output, the input-output unit 240 may take forms such as a liquid crystal display, a PC display, and a projector to display images and output voices. The features of the present invention are not limited in particular by an input-output method.

Image Analysis Process

Figure 3:
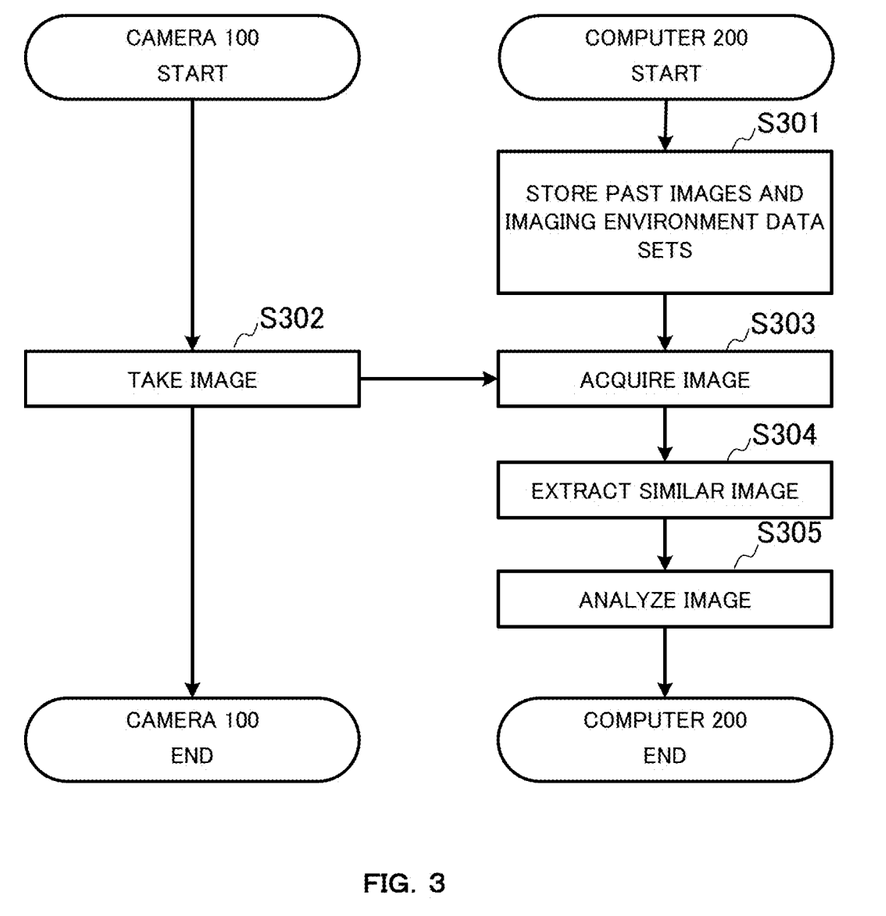
FIG. 3 shows a flow chart illustrating when the computer 200 analyzes an image taken by the camera 100.

FIG. 3 shows a flow chart illustrating the case where the computer 200 analyzes an image taken by the camera 100. The tasks executed by the modules will be described below with this process.

First, the past image memory unit 231 of the computer 200 associates and stores a plurality of analyzed past images with an imaging environment data set that includes setting data of a camera that took the past image and data on an object, in the memory unit 230 (Step S301). The memory unit 230 may be provided with a database storing a past image to store the data. The imaging environment data set is a set of environment data when an image is taken, including the angle in the horizontal direction of the camera when an image is taken, the type of an object, the distance to an object, the illuminance, the place, and the weather. The past image memory module 231 of the computer 200 previously stores a plurality of past images and their imaging environment data sets in the database storing a past image. The past image may be associated and stored with the image analysis result and the parameter for the image analysis. If a plurality of past images and their imaging environment data sets have already been stored, this process may be skipped.

Then, the imaging unit 10 of the camera 100 takes an image such as a still or moving image of a target object (Step S302). The camera 100 images a human, an animal, a landscape, an article, a crop, a tree, etc., as an object. The imaging instruction may be issued from the computer 200.

The acquisition module 211 of the computer 200 acquires an image taken by the camera 100 (Step S303).

FIG. 5 shows one example where the camera 100 images an object 400. This example shows that the acquisition module 211 of the computer 200 connected with the camera 100 through the communication network 300 acquires the image "ImageX" taken at 09:10:11, Aug. 8, 2016.

The similar image extraction module 212 of the computer 200 compares the image acquired in the step S303 with a past image registered in the database storing a past image and extracts a similar image (step S304).

FIG. 6 shows a table illustrating one example of the data structure of the imaging environment data set. In this example, an image has been registered together with an imaging environment data set. The image "ImageA" is associated with "Set 1," the image "ImageB" is associated with "Set2," the image "ImageC" is associated with "Set3," and the image "ImageD" associated with "Set4." The images "ImageA" to "ImageD" are schematically shown in FIG. 6. If the image acquired in the step S303 is the object 400 shown in FIG. 5, the past image similar to "ImageD" with "Set4" is extracted as a similar image in the step S304.

Finally, the image analysis module 213 of the computer 200 analyzes the image (Step S305). In this example, the image analysis module 213 analyzes the image "ImageX" by using the imaging environment data set "Set4" including "the angle in the horizontal direction of the camera when an image is taken: 30 degrees, the type of the object: a plant, the distance to the object: 8 meters, the illuminance: 240 lux, the place: outside, and the weather: clear." The image analysis performed by using the imaging environment data set "Set4" of "ImageD" similar to "ImageX" can obtain a better identification accuracy in a shorter time than by using the imaging environment data "Set1" including "the angle in the horizontal direction of the camera when an image is taken: 10 degrees, the type of the object: a human, the distance to the object: 3 meters, the illuminance: 100 lux, the place: outside, and the weather: cloudy."

The image analysis is appropriately performed in accordance with specific purposes such as face recognition to identify an individual, check of the extent of the damage to farm products caused by harmful insects, check of warehouse inventory, and image recognition of an affected area for medical diagnosis. Examples of the image analysis parameter include a filter range, the intensity of a filter, a binarization threshold, and an image processing order, which are also appropriately selected in accordance with specific purposes.

As described above, the present invention can provide a system, a method, and a program for image analysis that improve the accuracy of detection and identification of an object in image analysis, in the system for image analysis that analyzes an image taken by a camera.

Process to Additionally Store an Imaging Environment Data Set

Figure 4:
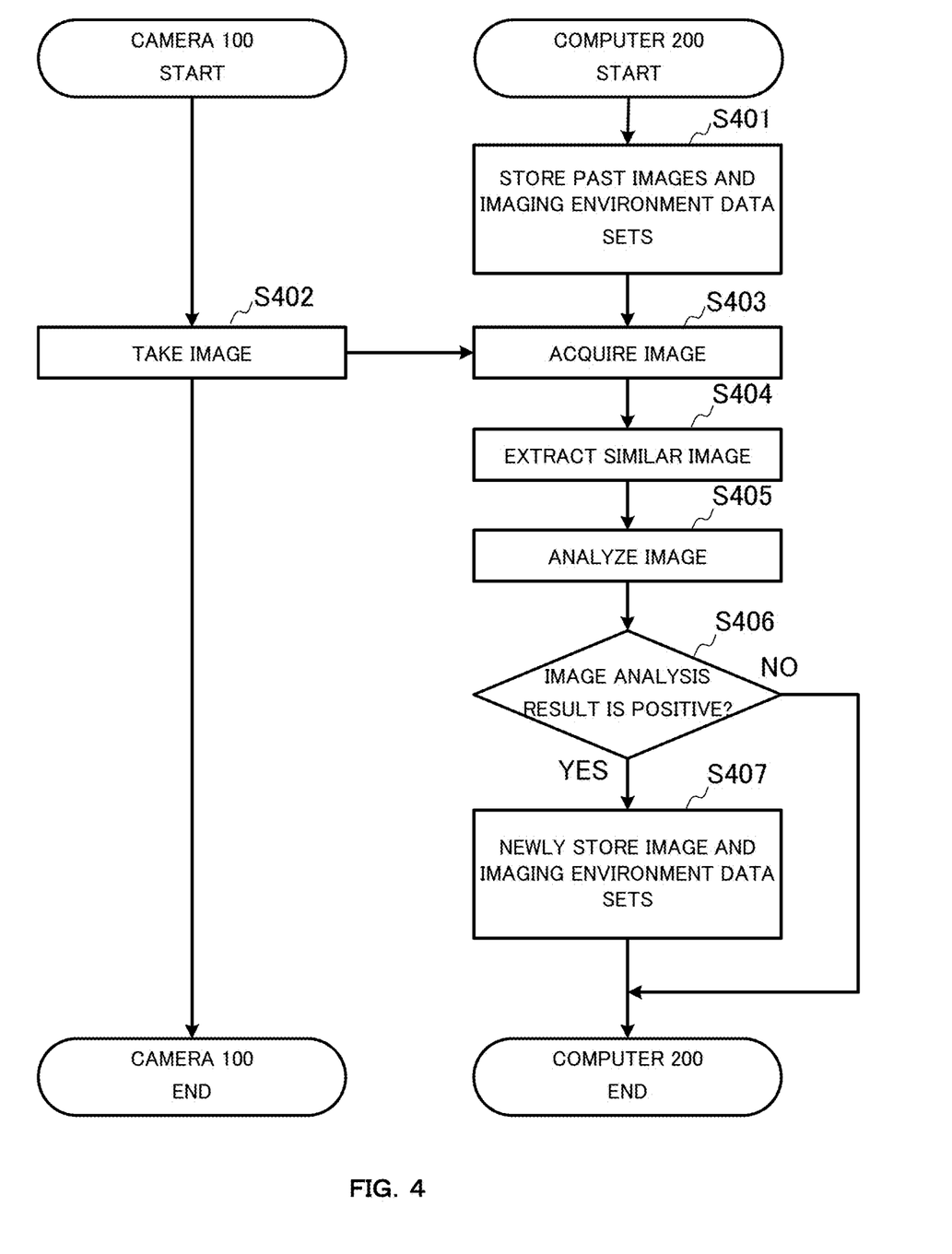
FIG. 4 shows a flow chart illustrating the case where an image and an environment data set that were used for image analysis are newly stored.

FIG. 4 shows a flow chart illustrating the case where an image and an environment data set that were used for image analysis are newly stored. The tasks executed by the modules will be described below with this process. Since the process from the step S401 to S405 shown in FIG. 4 corresponds to that from the step S301 to S305 shown in FIG. 3, the process from the step S406 will be described below.

After the image analysis in the step S405, the past image memory module 231 checks whether or not the image analysis result of using "the image environment data set "Set4" is positive (Step S406).

If the image analysis result of the step S405 is positive, the past image memory module 231 stores the imaging environment acquired in the step S403 together with the imaging environment data set "Set4" as a new image and its imaging environment data set (Step S407).

Figure 7:
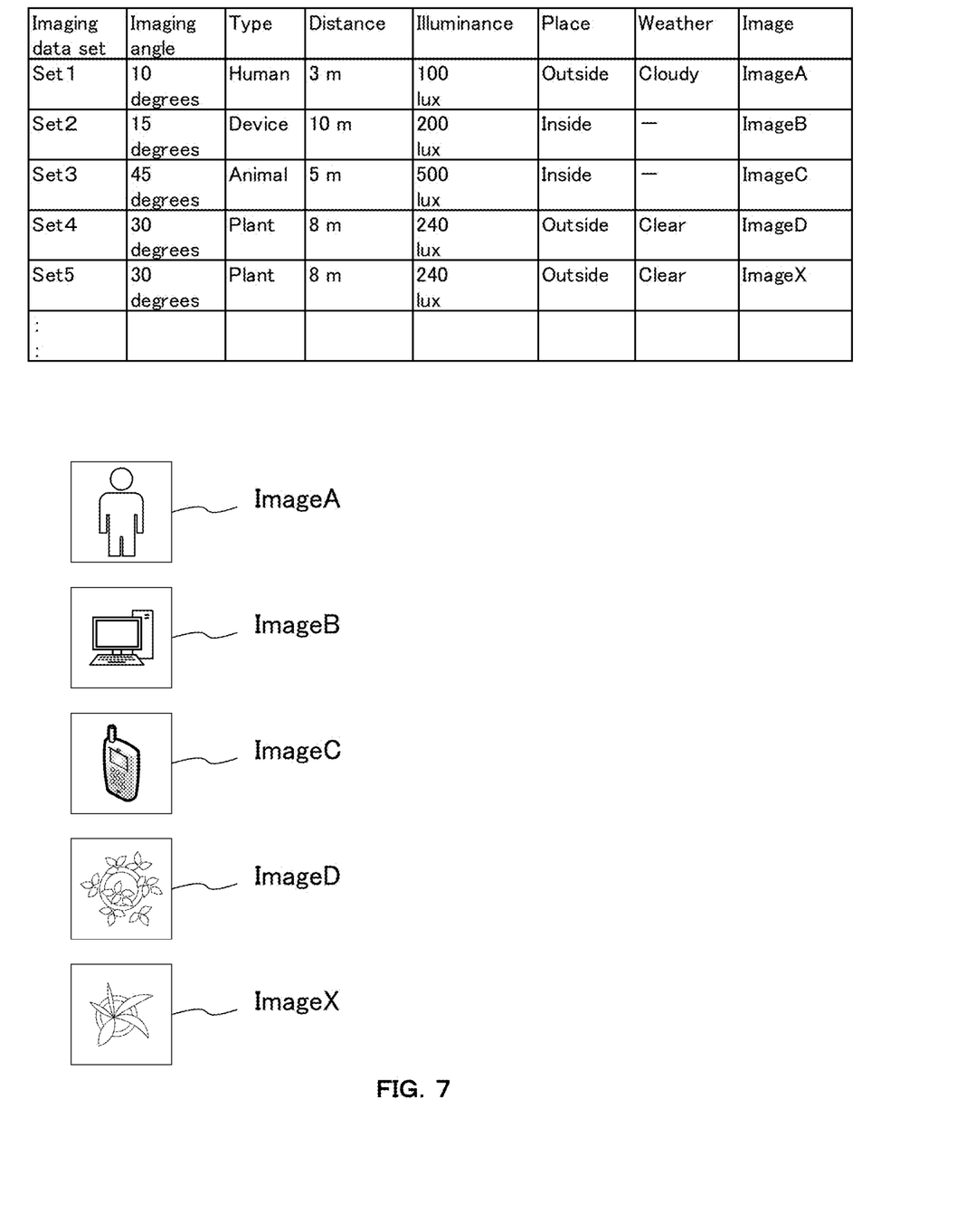
FIG. 7 shows a table illustrating one example of the data structure of the imaging environment data set in the case where an image and an environment data set that were used for image analysis are newly stored.

FIG. 7 shows a table illustrating one example of the data structure of the imaging environment data set in the case where an image and an environment data set that were used for image analysis are newly stored. In the table shown in FIG. 6, the environment data set "Set5" including "the angle in the horizontal direction of the camera when an image is taken: 30 degrees, the type of the object: a plant, the distance to the object: 8 meters, the illuminance: 240 lux, the place: outside, and the weather: clear" is additionally stored together with the image "ImageX." Accordingly, the environment data set "Set5" is also available from the next time of imaging.

If the image analysis result of the step S405 is negative, the past image memory module 231 ends this process without performing any further steps.

In the step S405, whether or not the image analysis result is positive may be automatically or manually judged based on a threshold, etc., in accordance with specific purposes such as face recognition to identify an individual, check of the extent of the damage to farm products caused by harmful insects, check of warehouse inventory, and image recognition of an affected area for medical diagnosis.

As described above, the present invention can more improve the accuracy of detection and identification in image analysis by the registration of a new image and its imaging environment data set with positive image analysis result, in the system for image analysis that analyzes an image taken by a camera.

Process to Acquire the Angle of a Camera

The camera 100 in the present invention is also capable to determine the distance to an object or to image an object from two or more different directions at the same time. The distance can be acquired from a sensor, etc., of the camera 100. If an object can be imaged from the two or more different directions at the same time, the distance can be determined by learning the length of the difference between the images taken by the two or more cameras and an actual distance. Moreover, the determined distance can be used to calculate the angle of a camera 100. Since how to determine the distance by the use of the two or more cameras is known as an existing technology, how to acquire the angle of a camera 100 will be explained herein below with reference to FIG. 8.

Figure 8:
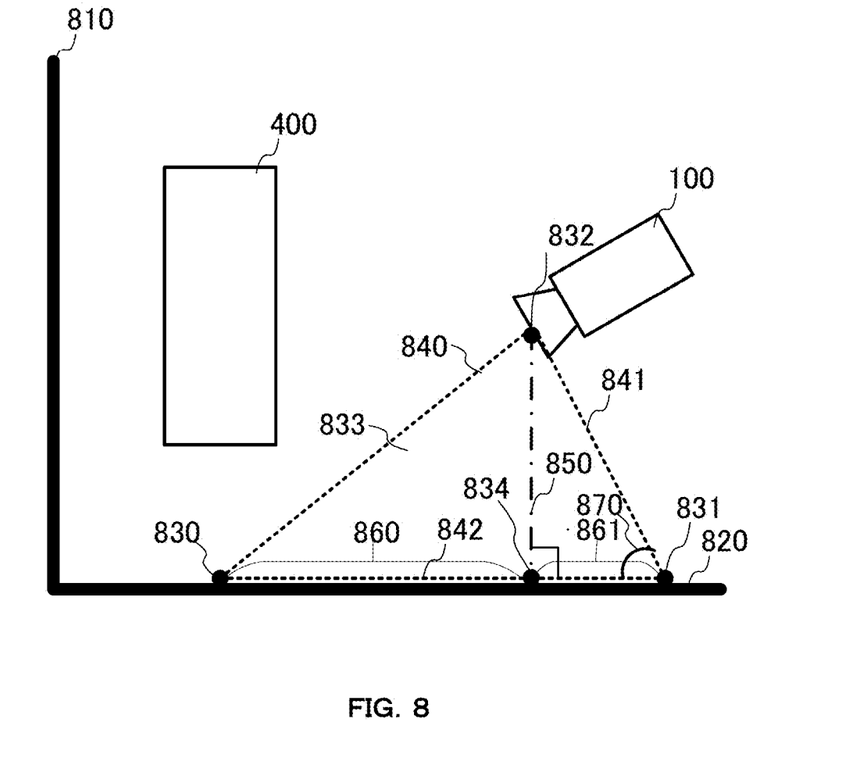
FIG. 8 schematically shows how the camera 100 acquires its angle.

FIG. 8 schematically shows how the camera 100 acquires its angle. In FIG. 8, the camera 100 is imaging an object 400, a wall 810, and a floor 820. The camera 100 or the computer 200 analyzes an image. If acquiring the angle of a camera 100, the camera 100 or the computer 200 recognizes the maximum area with a same pattern in an image as a plane such as a floor or a ground and acquires the angle of the camera 100 based on the inclination of the plane. In this example, the floor 820 corresponds to the plane.

The angle of a camera 100 may be acquired by the camera 100 or the computer 200. However, in the following description, the computer 200 acquires the angle of a camera 100 for the simplification. The computer 200 extracts two predetermined positions 830, 831 on the floor 820 as samples. The computer 200 connects the predetermined positions 830, 831 and the center position 832 of the imaging location to form a triangle 833. The triangle 833 has three sides 840, 841, 842. The computer 200 forms a perpendicular line 850 from the center position 832 to the floor 820 and then the intersection point 834 of the side 842 with the perpendicular line 850. The computer 200 learns the length of the difference between the images taken by two or more cameras and an actual distance, estimates the distance, and then calculates the lengths of the sides 840, 841 and the perpendicular line 850. The computer 200 calculates the lengths of the line segment 860 connecting the predetermined position 830 with the intersection point 834 and the line segment 861 connecting the predetermined position 831 with the intersection point 834 in the side 842. The computer 200 calculates the angle 870 by trigonometric substitution and acquires this angle 870 as the three-dimensional angle of the camera 100.

As described above, the present invention can calculate the distance to an object and the angle in the horizontal direction when the image is taken, by the use of the function to take an image of an object from two or more different directions at the same time, even if the camera 100 has no functions to determine the distance to an object.

To achieve the means and the functions that are described above, a computer (including a CPU, an information processor, and various terminals) reads and executes a predetermined program. For example, the program may be provided from a computer through a network, specifically, through Software as a Service (SaaS) or may be provided in the form recorded in a computer-readable medium such as a flexible disk, CD (e.g., CD-ROM), DVD (e.g., DVD-ROM, DVD-RAM), or a compact memory. In this case, a computer reads a program from the record medium, forwards and stores the program to and in an internal or an external storage, and executes it. The program may be previously recorded in, for example, a storage (record medium) such as a magnetic disk, an optical disk, or a magnetic optical disk and provided from the storage to a computer through a communication line.

The embodiments of the present invention are described above. However, the present invention is not limited to the above-mentioned embodiments. The effect described in the embodiments of the present invention is only the most preferable effect produced from the present invention. The effects of the present invention are not limited to those described in the embodiments of the present invention.

REFERENCE SIGNS LIST

100 Camera
200 Computer
300 Communication network
400 Object

What is claimed is:

1. A system for image analysis, comprising:
a data storage device that associates and stores a plurality of analyzed past images with an imaging environment data set that includes setting data of a camera that took the past image and data on an object; and
one or more processors that:
acquire an image;
extract a past image similar to the acquired image from the stored past images; and
apply the imaging environment data set of the extracted past image when image analysis was performed and analyzes the acquired image,
wherein the setting data includes an angle in a horizontal direction of the camera, and
wherein when the object and a horizontal plane are imaged by the camera, the one or more processors recognize a maximum area with a same pattern in an image taken by the camera as the horizontal plane and acquire the angle in the horizontal direction of the camera based on inclination of the horizontal plane.

2. The system according to claim 1, wherein the data storage device newly associates and stores the acquired image with the imaging environment data set applied by the image analysis unit.

3. The system according to claim 1, wherein the plurality of past images stored in the data storage device are 360-degree images.

4. The system according to claim 1, wherein the one or more processors:

extract first and second predetermined positions on the horizontal plane;
connect the first and second predetermined positions and a center position of an imaging location of the camera to form a triangle having a first side corresponding to the horizontal plane, a second side, and a third side;
form a perpendicular line from the center position to the third side and an intersection point of the third with the perpendicular line;
estimate lengths of the second side, the third side, and the perpendicular line by using two or more cameras; and
calculates an angle between the first side and the second side as the angle of the camera.

5. The method for image analysis, comprising:
associating and storing a plurality of analyzed past images with an imaging environment data set that includes setting data of a camera that took the past image and data on an object;
acquiring an image;
extracting a past image similar to the acquired image from the stored past images; and
applying the imaging environment data set of the extracted past image when image analysis was performed and analyzes the acquired image,
wherein when the object and a horizontal plane are imaged by the camera, the method further comprises recognizing a maximum area with a same pattern in an image taken by the camera as the horizontal plane and acquiring the angle in the horizontal direction of the camera based on inclination of the horizontal plane.

6. The method according to claim 5, wherein acquiring the angle comprises:
extracting first and second predetermined positions on the horizontal plane;
connecting the first and second predetermined positions and a center position of an imaging location of the camera to form a triangle having a first side corresponding to the horizontal plane, a second side, and a third side;
forming a perpendicular line from the center position to the third side and an intersection point of the third with the perpendicular line;
estimating lengths of the second side, the third side, and the perpendicular line by using two or more cameras; and
calculating an angle between the first side and the second side as the angle of the camera.

7. A computer program product for use in a system for controlling a drone, comprising a non-transitory computer usable medium having a set of instructions physically embodied therein, the set of instructions including computer readable program code, which when executed by the system causes one or more processors to execute:
associating and storing a plurality of analyzed past images with an imaging environment data set that includes setting data of a camera that took the past image and data on an object;
acquiring an image;
extracting a past image similar to the acquired image from the stored past images; and
applying the imaging environment data set of the extracted past image when image analysis was performed and analyzes the acquired image,
wherein the setting data includes an angle in a horizontal direction of the camera, and
wherein when the object and a horizontal plane are imaged by the camera, the set of instructions causes the one or more processors to further execute recognizing a maximum area with a same pattern in an image taken by the camera as the horizontal plane and acquiring the angle in the horizontal direction of the camera based on inclination of the horizontal plane.

8. The computer program product to claim 7, wherein the set of instructions causes the one or more processors to further execute extracting first and second predetermined positions on the horizontal plane;

connecting the first and second predetermined positions and a center position of an imaging location of the camera to form a triangle having a first side corresponding to the horizontal plane, a second side, and a third side;

forming a perpendicular line from the center position to the third side and an intersection point of the third with the perpendicular line;

estimating lengths of the second side, the third side, and the perpendicular line by using two or more cameras; and calculating an angle between the first side and the second side as the angle of the camera.

* * * * *